United States Patent
Kim et al.

(10) Patent No.: US 11,759,290 B2
(45) Date of Patent: *Sep. 19, 2023

(54) SILICATE GLASS, METHOD FOR PREPARING SILICATE GLASS-CERAMICS BY USING THE SILICATE GLASS, AND METHOD FOR PREPARING NANO LITHIUM DISILICATE GLASS-CERAMICS BY USING THE SILICATE GLASS

(71) Applicant: HASS CO., LTD, Gangneung-si (KR)

(72) Inventors: Yong Su Kim, Gangneung-si (KR); Hyun Jun Jeon, Busan (KR); Hyung Bong Lim, Ansan-si (KR); Kyung Sik Oh, Incheon (KR); Sung Ho Ha, Ansan-si (KR); Young Pyo Hong, Gangneung-si (KR); Joon Hyung Kim, Anseong-si (KR); Cheol Young Kim, Seoul (KR)

(73) Assignee: HASS CO., LTD, Gangneung-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/569,947

(22) Filed: Jan. 6, 2022

(65) Prior Publication Data

US 2022/0125554 A1 Apr. 28, 2022

Related U.S. Application Data

(62) Division of application No. 15/344,918, filed on Nov. 7, 2016, now abandoned.

(30) Foreign Application Priority Data

Apr. 6, 2016 (KR) .................... 10-2016-0042157

(51) Int. Cl.
*A61C 5/77* (2017.01)
*C03C 10/00* (2006.01)
(Continued)

(52) U.S. Cl.
CPC .................. *A61C 5/77* (2017.02); *A61C 5/73* (2017.02); *A61C 13/0004* (2013.01);
(Continued)

(58) Field of Classification Search
None
See application file for complete search history.

(56) References Cited

U.S. PATENT DOCUMENTS 3,804,608 A 4/1974 Gaskell et al.
4,189,325 A 2/1980 Barrett et al.
(Continued)

FOREIGN PATENT DOCUMENTS

EP 1253116 A1 10/2002
EP 1005841 B1 2/2005
(Continued)

*Primary Examiner* — Lisa L Herring
(74) *Attorney, Agent, or Firm* — NKL Law; Jae Youn Kim

(57) ABSTRACT

Provided is a silicate glass, a method for preparing a silicate glass-ceramics by using the silicate glass, and a method for preparing a lithium disilicate glass-ceramics by using the silicate glass, and more particularly, to a method for preparing a glass-ceramics that has a nanosize of 0.2 to 0.5 μm and contains lithium disilicate and silicate crystalline phases. A nano lithium disilicate glass-ceramics containing a $SiO_2$ crystalline phase includes: a glass composition including 70 to 85 wt % $SiO_2$, 10 to 13 wt % $Li_2O$, 3 to 7 wt % $P_2O_5$ working as a nuclei formation agent, 0 to 5 wt % $Al_2O_3$ for increasing a glass transition temperature and a softening point and enhancing chemical durability of glass, 0 to 2 wt % $ZrO_2$, 0.5 to 3 wt % CaO for increasing a thermal expansion coefficient of the glass, 0.5 to 3 wt % $Na_2O$, 0.5 to 3 wt % $K_2O$, and 1 to 2 wt % colorants, and 0 to 2.0 wt % mixture of MgO, ZnO, F, and $La_2O_3$.

7 Claims, 3 Drawing Sheets

(51) Int. Cl.

| | | |
|---|---|---|
| C03C 8/24 | (2006.01) | |
| C03C 3/097 | (2006.01) | |
| C03C 4/00 | (2006.01) | |
| C04B 37/04 | (2006.01) | |
| C04B 35/14 | (2006.01) | |
| C04B 35/16 | (2006.01) | |
| C04B 37/00 | (2006.01) | |
| A61C 5/73 | (2017.01) | |
| A61C 13/00 | (2006.01) | |
| A61C 13/08 | (2006.01) | |
| A61C 13/083 | (2006.01) | |
| A61C 13/20 | (2006.01) | |
| C03C 27/00 | (2006.01) | |
| A61C 13/30 | (2006.01) | |

(52) U.S. Cl.
CPC .......... *A61C 13/082* (2013.01); *A61C 13/083* (2013.01); *A61C 13/20* (2013.01); *A61C 13/30* (2013.01); *C03C 3/097* (2013.01); *C03C 4/0021* (2013.01); *C03C 8/24* (2013.01); *C03C 10/0009* (2013.01); *C03C 27/00* (2013.01); *C04B 35/14* (2013.01); *C04B 35/16* (2013.01); *C04B 37/001* (2013.01); *C04B 37/042* (2013.01); *C04B 37/045* (2013.01); *C03C 2204/00* (2013.01); *C04B 2235/3201* (2013.01); *C04B 2235/3203* (2013.01); *C04B 2235/3206* (2013.01); *C04B 2235/3208* (2013.01); *C04B 2235/3217* (2013.01); *C04B 2235/3227* (2013.01); *C04B 2235/3244* (2013.01); *C04B 2235/3284* (2013.01); *C04B 2235/34* (2013.01); *C04B 2235/36* (2013.01); *C04B 2235/445* (2013.01); *C04B 2235/80* (2013.01); *C04B 2235/9661* (2013.01); *C04B 2237/10* (2013.01); *C04B 2237/341* (2013.01); *C04B 2237/348* (2013.01)

(56) References Cited

U.S. PATENT DOCUMENTS

| | | |
|---|---|---|
| 4,515,634 A | 5/1985 | Wu et al. |
| 5,219,799 A | 6/1993 | Beall et al. |
| 5,702,514 A | 12/1997 | Petticrew |
| 5,968,856 A | 10/1999 | Schweiger et al. |
| 6,342,458 B1 | 1/2002 | Schweiger et al. |
| 6,372,319 B1 | 4/2002 | Abe et al. |
| 6,375,729 B1 | 4/2002 | Brodkin et al. |
| 6,420,288 B2 | 7/2002 | Schweiger et al. |
| 6,455,451 B1 | 9/2002 | Brodkin et al. |
| 6,495,480 B1 | 12/2002 | Goto |
| 6,514,893 B1 | 2/2003 | Schweiger et al. |
| 6,517,623 B1 | 2/2003 | Brodkin et al. |
| 6,606,884 B2 | 8/2003 | Schweiger et al. |
| 6,802,894 B2 | 10/2004 | Brodkin et al. |
| 6,818,573 B2 | 11/2004 | Petticrew |
| 2003/0073563 A1 | 4/2003 | Brodkin et al. |
| 2007/0082294 A1 | 4/2007 | Goto et al. |
| 2013/0288026 A1* | 10/2013 | Johnson .............. A61C 13/00 428/212 |
| 2015/0104655 A1 | 4/2015 | Kim et al. |
| 2015/0274580 A1 | 10/2015 | Vollmann et al. |
| 2015/0284288 A1 | 10/2015 | Ellison et al. |
| 2015/0374589 A1 | 12/2015 | Rampf et al. |
| 2016/0060159 A1 | 3/2016 | Kim et al. |
| 2018/0244564 A1 | 8/2018 | Ritzberger et al. |
| 2018/0282204 A1 | 10/2018 | Rampf et al. |

FOREIGN PATENT DOCUMENTS

| | | |
|---|---|---|
| EP | 1534169 B1 | 3/2006 |
| EP | 3135269 A1 | 3/2017 |
| JP | 2000-086289 A | 3/2000 |
| JP | 2011-225441 A | 11/2011 |
| JP | 2012-250911 A | 12/2012 |
| KR | 10-2012-0073710 A | 7/2012 |
| KR | 10-1262121 B1 | 5/2013 |
| KR | 10-2015-0043633 A | 4/2015 |
| KR | 10-2016-0027357 A | 3/2016 |

* cited by examiner

SILICATE GLASS, METHOD FOR PREPARING SILICATE GLASS-CERAMICS BY USING THE SILICATE GLASS, AND METHOD FOR PREPARING NANO LITHIUM DISILICATE GLASS-CERAMICS BY USING THE SILICATE GLASS

CROSS-REFERENCE(S) TO RELATED APPLICATION

This application is a divisional application of U.S. patent application Ser. No. 15/344,918 filed on Nov. 7, 20216, and claims benefit of priority of Korean Patent Application No. 10-2016-0042157, filed on Apr. 6, 2016, in the Korean Intellectual Property Office, the contents of which are hereby incorporated by reference in their entirety.

BACKGROUND OF THE INVENTION

Field of the Invention

The present invention relates to a silicate glass, a method for preparing a silicate glass-ceramics by using the silicate glass, and a method for preparing a nano lithium disilicate glass-ceramics by using the silicate glass, and more particularly, to a method for preparing a glass-ceramics containing a nano lithium disilicate phase and a silicate crystalline phase.

Description of the Related Art

With economic development and increased income, an interest in appearance has been increased, and an interest in aesthetics of dental prosthetic materials has been increased in response to the interest in appearance. As a result, various kinds of dental prosthetic restoration materials with the aesthetics are introduced, and among them, various non-metal crown materials without using metals have been developed.

The crown materials mean prosthetic materials for restoring enamel and dentin parts of the damaged tooth. The crown materials are classified into inlay, onlay, veneer, crown, and the like according to an applied region. Since the region restored by the crown material is the outer surface of the tooth, the aesthetics is highly required and the high strength is required due to fractures such as abrasion and chipping of antagonist teeth. Materials which are used as the crown materials in the related art are leucite glass-ceramics, reinforced porcelain, or fluorapatite ($Ca_5(PO_4)_3F$) glass-ceramics. Even thought the materials have the excellent aesthetics, there is a disadvantage in that the possibility of fracture is high due to low strength of 80 to 120 MPa. Therefore, currently, studies of developing various high-strength crown materials have been conducted.

Lithium silicate glass-ceramics was introduced by Marcus P. Borom and Anna M. Turkalo (The Pacific Coast Regional Meeting, The American Ceramic Society, San Francisco, Calif., Oct. 31, 1973 (Glass division, No. 3-G-73P)) in 1973. The formation of various crystalline nuclei and the crystalline and the strength for each growth heat treatment condition were studies by using $Li_2O$—$Al_2O_3$—$SiO_2$—$Li_2O$—$K_2O$—$B_2O_3$—$P_2O_5$-based glasses. When the high-temperature lithium disilicate crystalline is shown from low-temperature lithium metasilicate, the strength of 30 to 35 KPS is shown. The strength is caused by residual stress due to a difference in thermal expansion coefficient between base glass, mother glass, $Li_2SiO_5$, and $Li_2SiO_3$ crystals.

A material and a method for manufacturing an artificial tooth (monolithic dental crown) by using glass containing a lithium disilicate crystal are disclosed in a plurality of patent documents. However, according to the known techniques, due to a coarse crystalline phase, it is difficult to directly machine the glass containing the lithium disilicate crystal. In order for machining, it is necessary to primarily form and machine a lithium metasilicate crystalline phase (machinable crystalline) and secondarily form a high-strength lithium disilicate crystalline phase by performing a heat treatment. Thus, dimension accuracy is lowered due to shrinkage caused by the heat treatment, and it is inconvenient to additionally perform the heat treatment. Generally, since CAD/CAM machining is directly performed in a dental clinic and needs to be applied to a patient as quickly as possible (one-day appointment), a time delay due to a heat treatment imposes financial difficulties on a patient and a user.

In addition, since an existing lithium disilicate glass-ceramic material has a coarse crystalline phase, there is a limitation in realizing high light transmittance or opalescence similar to those of a natural tooth.

In particular, in order to machine the existing lithium disilicate glass-ceramic material, lithium metasilicate glass-ceramics having excellent machinability are primarily prepared, and then, lithium disilicate is prepared through a secondary crystallization heat treatment to improve strength. In this case, a crystalline phase has a size of 3 μm or more. In this state, machinability is considerably lowered and only high strength is obtained.

SUMMARY OF THE INVENTION

An aspect of the present invention is directed to propose a method for preparing a glass-ceramics containing a nano lithium disilicate phase and a silicate crystalline phase.

Another aspect of the present invention is directed to propose a method for preparing a glass-ceramics containing lithium disilicate and a silicate crystalline phase, which has excellent machinability.

Another aspect of the present invention is directed to propose a method for preparing a glass-ceramics containing nano lithium disilicate and silicate crystalline phase, which is capable of realizing aesthetics such as opalescence similar to that of a natural tooth due to causing scattering of light caused by fine particles.

Another aspect of the present invention is directed to propose a method for preparing a glass-ceramics containing a nano lithium disilicate phase and a silicate crystalline phase, which has excellent light transmittance due to a fine crystalline phase.

According to an embodiment of the present invention, a nano lithium disilicate glass-ceramics containing a $SiO_2$ crystalline phase includes: a glass composition including 70 to 85 wt % $SiO_2$, 10 to 13 wt % $Li_2O$, 3 to 7 wt % $P_2O_5$ working as a nuclei formation agent, 0 to 5 wt % $Al_2O_3$ for increasing a glass transition temperature and a softening point and enhancing chemical durability of glass, 0 to 2 wt % $ZrO_2$, 0.5 to 3 wt % CaO for increasing a thermal expansion coefficient of the glass, 0.5 to 3 wt % $Na_2O$, 0.5 to 3 wt % $K_2O$, and 1 to 2 wt % colorants, and 0 to 2.0 wt % mixture of MgO, ZnO, F, and $La_2O_3$.

According to an embodiment of the present invention, a method for preparing a nano lithium disilicate glass-ceramics containing a $SiO_2$ crystalline phase includes: melting the glass composition of any one of claims 1 to 3 and performing crystal growth; performing a primary heat treatment at a temperature of 300 to 700° C. for 1 minute to 2 hours; and bonding primarily heat-treated glass-ceramics to a zirconia post by using an inorganic bond, wherein the bonding comprises heat-treating the inorganic bond at a temperature of 700 to 900° C. for 1 minute to 2 hours.

The inorganic bond of the present invention may include 8 to 12 wt % $Li_2O$, 50 to 75 wt % $SiO_2$, 0 to 3 wt % $Al_2O_3$, 0.5 to 5 wt % CaO, 0.5 to 3 wt % $Na_2O$, 0.5 to 3 wt % $K_2O$, 0.5 to 7 wt % $P_2O_5$ as a nuclei formation agent, 0.5 to 1 wt % colorant, and 0 to 1.0 wt % mixture of MgO, ZnO, F, and $La_2O_3$, and the thermal expansion coefficient is 9.5 to $10.8 \times 10^{-6}/° C$.

DETAILED DESCRIPTION OF EMBODIMENTS

Figure 1:
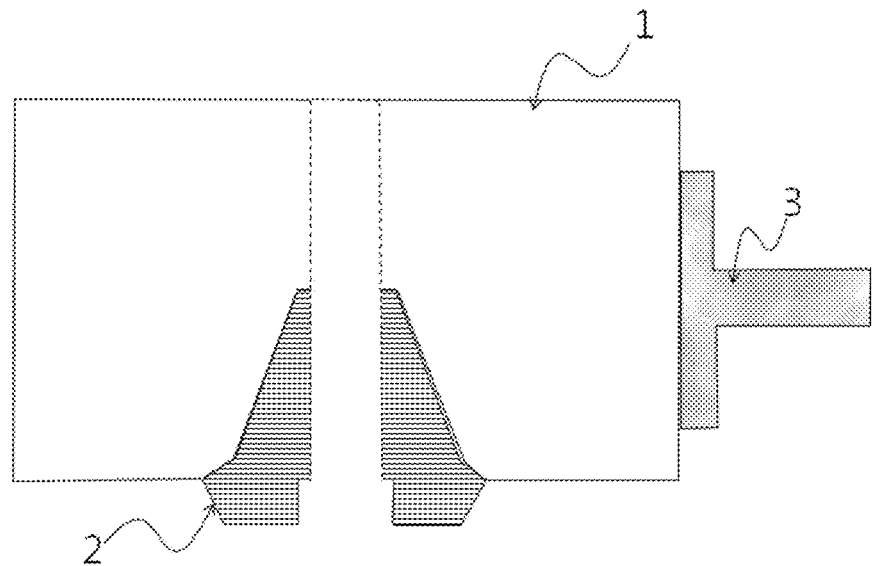
FIG. 1 is a conceptual diagram of an aesthetic prosthetic block for CAD/CAM machining, to which two materials, that is, a glass-ceramics and zirconia proposed in the present invention are applied.

The aforementioned and additional aspects of the present invention will be clearer through exemplary embodiments described with reference to the accompanying drawings. Hereinafter, the present invention will be described in detail so as to be easily understood and reproduced by those skilled in the art through the exemplary embodiments.

A high-strength glass-ceramics for a tooth according to the present invention includes a $SiO_2$ cluster, a lithium disilicate crystal, and hyaline. Since the high-strength glass-ceramics exhibits a very similar color to that of a natural tooth as a whole, the high-strength glass-ceramics is highly aesthetic and is suitable for use as a dental material.

The aesthetics, particularly, light transmittance is largely affected by the degree of light scattering caused by a difference in refractive index between different crystallines in dense bulk. The $SiO_2$ cluster has a refractive index of 1.48. As a content of the $SiO_2$ cluster increases, an interface between the $SiO_2$ cluster and mother glass or a lithium disilicate crystalline phase increases. Accordingly, transmittance decreases due to high scattering of light. Therefore, in order to obtain light-transmitting properties usable for the dental material, a prosthetic material having various light-transmitting properties may be prepared by forming an appropriate amount of only a $SiO_2$ cluster crystalline phase within a glass.

In the case of an existing lithium disilicate glass-ceramics, a prosthesis has been manufactured by primarily forming a lithium metasilicate glass-ceramics having low strength of 220 MPa or less, machining the lithium metasilicate glass-ceramics, and increasing strength to 350 MP through a secondary heat treatment. Due to shrinkage generated in the secondary heat treatment and the inconvenience of the process, the above-described prosthesis manufacturing method is time-consuming in a dental clinic which requires a prompt clinical treatment. In particular, since a recent dental treatment takes only several hours until the dental treatment is completed after a patient comes in for the dental treatment, the existing glass-ceramic material is not suitable for a current dental treatment.

The present invention proposes a novel method capable of directly machining a high-strength material by forming a nano-sized lithium disilicate crystalline phase and a $SiO_2$ cluster coarser than the nano-sized lithium disilicate crystalline phase. The novel method is applicable to a dentistry to secure dimension accuracy and prompt prosthesis machining, thereby satisfying both of a patient and a dentist. In addition, since 1:1 machining is applicable to the high-strength material, the high-strength material may be used as a block material in which an implant case and a zirconia post are combined.

More specifically, the present invention proposes an artificial prosthetic material which is directly applicable to a clinical treatment after 1:1 machining, without a heat treatment, by adjusting a crystalloid size of the high-strength glass-ceramics to a nanosize of 0.2 to 0.5 μm, so that the high-strength glass-ceramics is machinable. This is because the $SiO_2$ cluster having a size of 0.5 to 1.0 μm is precipitated together with the nano crystalline phase (lithium disilicate) for improving machinability.

Hereinafter, a method for preparing a glass-ceramics for CAD/CAM machining, to which a zirconia post is coupled by an inorganic bond, according to a preferred embodiment of the present invention, will be described.

A high-strength glass-ceramics for a tooth according to the present invention includes a lithium disilicate crystal and $SiO_2$. A glass applicable for improving strength and aesthetic light-transmitting properties includes: a glass composition including 70 to 85 wt % $SiO_2$, 10 to 13 wt % $Li_2O$, 3 to 7 wt % $P_2O_5$ working as a nuclei formation agent, 0 to 5 wt % $Al_2O_3$ for increasing a glass transition temperature and a softening point and enhancing chemical durability of the glass, 0 to 2 wt % $ZrO_2$, 0.5 to 3 wt % CaO for increasing a thermal expansion coefficient of the glass, 0.5 to 3 wt % $Na_2O$, 0.5 to 3 wt % $K_2O$, 1 to 2 wt % colorants, and 0 to 2.0 wt % mixture of MgO, ZnO, F, and $La_2O_3$. Alkali oxide may be $K_2O$ or $Na_2O$, and further, may include both $K_2O$ and $Na_2O$.

The dental high-strength glass-ceramics according to the exemplary embodiment of the present invention may further include 1 to 2 wt % colorant as described above in order to provide the same or similar color as or to the teeth. The colorant is to provide the same or similar color and fluorescence as or to the teeth and may use red iron oxide ($Fe_2O_3$), yellow ceria ($CeO_2$), orange vanadium pentoxide ($V_2O_5$), black vanadium trioxide $V_2O_3$, $Er_2O_3$, $Tb_2O_3$, $Pr_2O_3$, $TaO_2$, $MnO_2$, or a mixture thereof. For example, red iron oxide ($Fe_2O_3$), ceria ($CeO_2$), or vanadium pentoxide ($V_2O_5$) is added together with starting materials to be melted to have a light yellow which is similar to the teeth's color. Titanium oxide ($TiO_2$) has white to provide a very similar color to the teeth's color.

The aforementioned starting materials are measured and mixed. In this case, $Li_2CO_3$ instead of $Li_2O$ may be added and carbon dioxide ($CO_2$) as a carbon (C) component of $Li_2CO_3$ is discharged and removed as gas in a melting process of the glass. Further, in alkali oxide, $K_2CO_3$ and $Na_2CO_3$ instead of $K_2O$ and $Na_2O$ may be added, respectively, and carbon dioxide ($CO_2$) as carbon (C) components of $K_2CO_3$ and $Na_2CO_3$ is discharged and removed as gas in a melting process of the glass.

The mixing process uses a dry mixing process, and a ball milling process and the like may be used as the dry mixing process. When describing the ball milling process in detail, the starting materials are put in a ball milling machine and mechanically grinded and uniformly mixed by rotating the ball milling machine at a predetermined speed. The balls used in the ball milling machine may use balls made of ceramic materials such as zirconia or alumina, and the sizes of the balls may be the same as each other or has at least two sizes. The size of the ball, milling time, rpm of the ball milling machine, and the like are controlled by considering a desired size of the particle. In an example, taking into account a particle size, a size of a ball may be set to a range of 1 to 30 mm, and a rotational speed of a ball milling machine may be set to a range of 50 to 500 rpm. Taking into account a targeted particle size or the like, it is desirable that ball milling is performed for 1 to 48 hours. A starting raw material is pulverized into fine particles through the ball milling, and the fine particles have a uniform particle size and are also uniformly mixed.

The mixed starting material is put in a melting furnace and melted by heating the melting furnace with the starting material. Herein, the melting means that the starting materials are changed into a material state having viscosity in a liquid state other than a solid state. It is preferred that the melting furnace is made of a material having a high melting point, a large strength, and a low contact angle in order to suppress a molten material from being attached. To this end, it is preferred that the melting furnace is a melting furnace made of a material such as platinum (Pt), diamond-like-carbon (DLC), and chamotte or coated on the surface with a material such as platinum (Pt) or diamond-like-carbon (DLC).

The melting is performed for 1 to 12 hours at atmospheric pressure. When the melting temperature is less than 1,400° C., the starting materials may not be melted. When the melting temperature is more than 2,000° C., the starting materials are not economic due to excessive energy consumption, and thus, it is preferred that the starting materials are melted in the aforementioned range. Further, when the melting time is too short, the starting materials may not be sufficiently melted, and when the melting time is very large, the starting materials are not economic due to excessive energy consumption. It is preferred that the heating rate of the melting furnace is 5 to 50° C./min. When the heating rate of the melting furnace is very slow, a lot of time is taken and thus, productivity is deteriorated, and when the heating rate of the melting furnace is very fast, the volatile amount of the starting materials is increased, and thus, the property of the glass-ceramics may be bad. As a result, it is preferred that the temperature of the melting furnace is increased at the heating rate in the aforementioned range. It is preferred that the melting is performed at an oxygen atmosphere such as air.

In order to obtain the dental glass-ceramics having desired shape and size, the molten material is poured in a predetermined mold. It is preferred that the mold is made of a material having a high melting point, a large strength, and a low contact angle for suppressing the glass molten material from being attached. To this end, the mold is made of a material such as graphite and carbon, and it is preferred that the molten material is preheated at 200 to 300° C. and poured in the mold in order to prevent thermal shock.

In order to obtain the dental glass-ceramics having desired shape and size, the molten material is poured in a predetermined mold. It is preferred that the mold is made of a material having a high melting point, a large strength, and a low contact angle for suppressing the glass molten material from being attached. To this end, the mold is made of a material such as graphite and carbon, and it is preferred that the molten material is preheated at 200 to 300° C. and poured in the mold in order to prevent thermal shock.

The molten material contained in the mold is cooled and transferred to a crystallization heat-treatment furnace to perform nuclei formation and crystal growth of the glass. In the first heat treatment, the crystallization heat treatment is performed at 300 to 700° C. and a holding time is 1 minute to 2 hours. Since the second heat treatment process is a selective process, the glass-ceramics may be immediately applied to the prosthesis after processing without the second heat treatment process after the first heat treatment, or applied to the prosthesis after increasing the strength by increasing the crystal growth through the second heat treatment process. In this case, the second heat treatment process is performed for the holding time of 1 minute to 2 hours at 750 to 950° C., and the second heat treatment may be selectively determined by customers by considering a strength requirement degree, shortage of the prosthesis preparing process, and the like.

When a temperature of a primary heat treatment is lower than 300° C., a nucleus may not be formed due to a low temperature. When the temperature of the primary heat treatment is higher than or equal to 700° C., a size of the nucleus may increase, and thus, machining may be difficult and a block may be deformed. A secondary heat treatment is an option for a user. When a temperature of the secondary heat treatment is lower than 750° C., a crystalline phase may be scarcely formed, and thus, the secondary heat treatment is inefficient. When the temperature of the secondary heat treatment is higher than or equal to 950° C., a glass-ceramics may be deformed, and thus, the secondary heat treatment is not applicable. CAD/CAM machining may be performed after a heat treatment for nuclei formation or a heat treatment for nuclei formation-crystal growth. After the secondary heat treatment, aesthetics to which 1:1 machining is applicable is predetermined.

When the heat treatment time is too short, the crystal growth may not sufficiently occur, and when the heat treatment time is too long, the consumption of excessive energy is required, and thus, it is not economical. It is preferred that the heating rate up to the heat treatment temperature is approximately. When the heating rate is too slow, a lot of time is taken and thus, the productivity is deteriorated. When the heating rate is too fast, the volatile amount of the starting materials is increased due to the rapid temperature increase, and thus, the property of the glass-ceramics may be bad. As a result, it is preferred that the temperature of the melting furnace is increased at the heating rate in the aforementioned range. The heat treatment is performed at an oxygen atmosphere such as oxygen ($O_2$) and air. Atoms in the glass structure move by heat treatment and thus, the phase transition of the glass occurs. That is, when the crystal growth occurs by the heat treatment, the crystallization including lithium silicate crystal occurs, and as a result, the glass-ceramics may be obtained.

The zirconia-boned glass-ceramics block or the metal/zirconia-bonded glass-ceramics block obtained through the aforementioned crystallization heat treatment is processed in a crown shape through cutting to provide a color characteristic to be close to natural teeth, and then, bonded to an implant material.

Hereinafter, a preparation method of lithium disilicate glass-ceramics or glass to an artificial prosthesis will be described by using a squeeze casting method.

The squeeze casting is performed by a method of pushing a glass or glass-ceramics ingot into a crown-shaped empty space positioned in an embedded material by lowering the viscosity of the glass at 920° C. to 1,000° C. Further, simultaneously, the glass phase is phase-converted into the lithium disilicate crystalline, the lithium disilicate ingot becomes the lithium disilicate crystalline as it is after squeeze casting heat treatment, and there is a difference that the crystal shape is increased in a uni-axial direction.

The metal/zirconia/glass-ceramics bonding by the inorganic bond may be simultaneously or separately performed. The bonding condition of the metal/zirconia/glass-ceramics is performed by hot bonding at 700 to 900° C. for 1 minute to 2 hours as described above. The inorganic bond was invented by a highly active composition which is bondable with an inert zirconia material. 8 to 12 wt % $Li_2O$ having high reaction with zirconia, 50 to 70 wt % $SiO_2$ corresponding to a structural frame, 0 to 3 wt % $Al_2O_3$ to increase a glass transition temperature and a softening point and enhance chemical durability of the glass, 0.5 to 5 wt % CaO to increase the thermal expansion coefficient of the glass, 0.5 to 3 wt % $Na_2O$, and 0.5 to 3 wt % $K_2O$ are added, 0.5 to 7 wt % $P_2O_5$ as a nuclei formation agent for indicating the opacity when applying the colorant to the bond and 0.5 to 1 wt % of other colorants are included, and MgO, ZnO, F, and $La_2O_3$ are mixed and added with 0 to 1.0 wt % due to the effect on light transmittance. The composition of the inorganic bond is designed to a composition having the thermal expansion coefficient of $9.5~10.8\times10-6/°$ C. so that the thermal expansion efficient is matched between the metal and zirconia and between zirconia and the glass-ceramics block in addition to the chemical bond with zirconia.

The glass-ceramics for bonding zirconia and the inorganic bond according to the present invention may prepare the crown prosthetic material including metal link/zirconia post/glass-ceramics which is impossible in the related to an artificial aesthetic prosthesis through CAD/CAM processing. The present invention has an advantage of improving low bonding strength between the metal/glass-ceramics, low fracture resistance, and aesthetics inhibition of the existing implant aesthetic prosthesis. Particularly, the inorganic bond which is chemically bondable with zirconia as an inert material through hot bonding is a bonding method which is first attempted. In addition, since the inorganic bond can not be produced when the glass-ceramics is not matched with the thermal expansion coefficient of zirconia even though the predetermined condition is set, the glass-ceramics composition is the invention which is first proposed in zirconia hot bonding.

FIG. 1 is a schematic view of a CAD/CAM processed aesthetic prosthetic block to which glass-ceramics block/zirconia post/metal link are applied. Hot bonding of a glass-ceramics block 1 and a zirconia post 2 is performed by the inorganic bond. In this case, the glass-ceramics block is not deformed even at a hot bonding temperature and processability needs to be ensured. The glass-ceramics of the present invention can be mechanically processed even through a hot bonding condition at 700 to 900° C. for 1 minute to 2 hours, and thereafter, light transmittance and a color which are aesthetic characteristics to be applicable as the artificial prosthetic material need to be expressed. In addition, if necessary, the glass-ceramics is a selectable material which may be used in an application field to which higher load is applied by increasing the strength through the second crystallization heat treatment process (at 750 to 920° C. for the holding time of 1 minute to 2 hours). A metal holder 3 is coupled to machine equipment.

Figure 2:
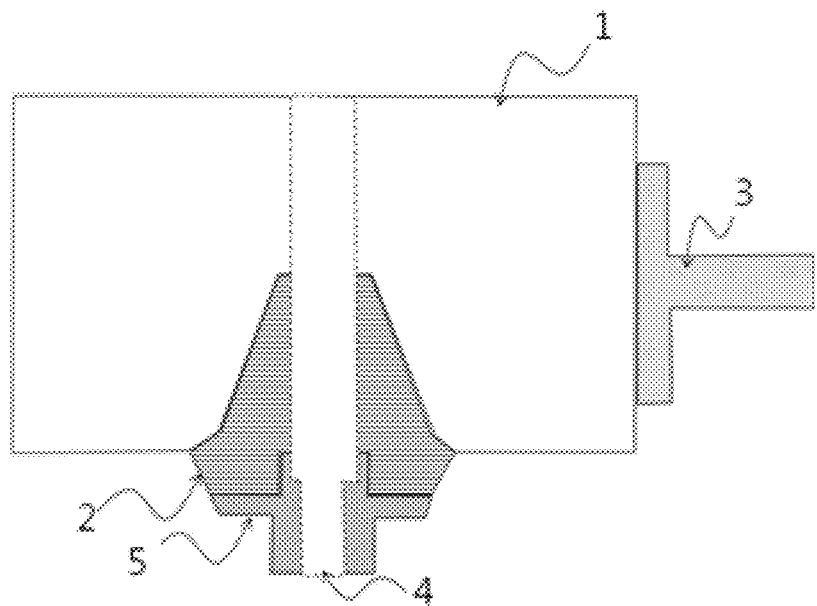
FIG. 2 is a conceptual diagram of an aesthetic prosthetic block for CAD/CAM machining, to which three materials, that is, a glass-ceramic block, a zirconia post, and a metal link proposed in the present invention are applied.

FIG. 2 is a conceptual diagram of an aesthetic prosthetic block for CAD/CAM machining, to which glass-ceramic block/zirconia post/metal link is applied. A glass-ceramic block 1 and a zirconia post 2 are hot-bonded by an inorganic bond. At this time, the glass-ceramic block 1 must have a composition that is not deformed and secures machinability at a temperature at which the hot bonding is performed.

A bonding heat treatment condition is substantially the same as that described with reference to FIG. 1. A metal link 5 is coupled to an implant fixture, and a coupling screw hole 4 is formed in the metal link 5. In the past, resin-based cement has been used for bonding between a metal link and zirconia. However, according to the present invention, the hot bonding is performed to increase an adhesive force and improve prosthesis applicability. The bonding between the metal link 5 and the zirconia post 2 may be performed even upon bonding of glass/zirconia/metal. In order to reduce oxidation of the metal during the heat treatment, the metal link 5 may be separately bonded to pre-bonded glass-ceramics/zirconia at a low temperature. The metal holder 3 is coupled to the machine equipment.

The block of the machining state according to the present invention has strength greater than that of an existing product and is also machinable. Since the block exhibits high strength in the machining state, the block is directly applicable to a clinical treatment after machining. Also, a color thereof matches a color of a natural tooth.

Figure 3:
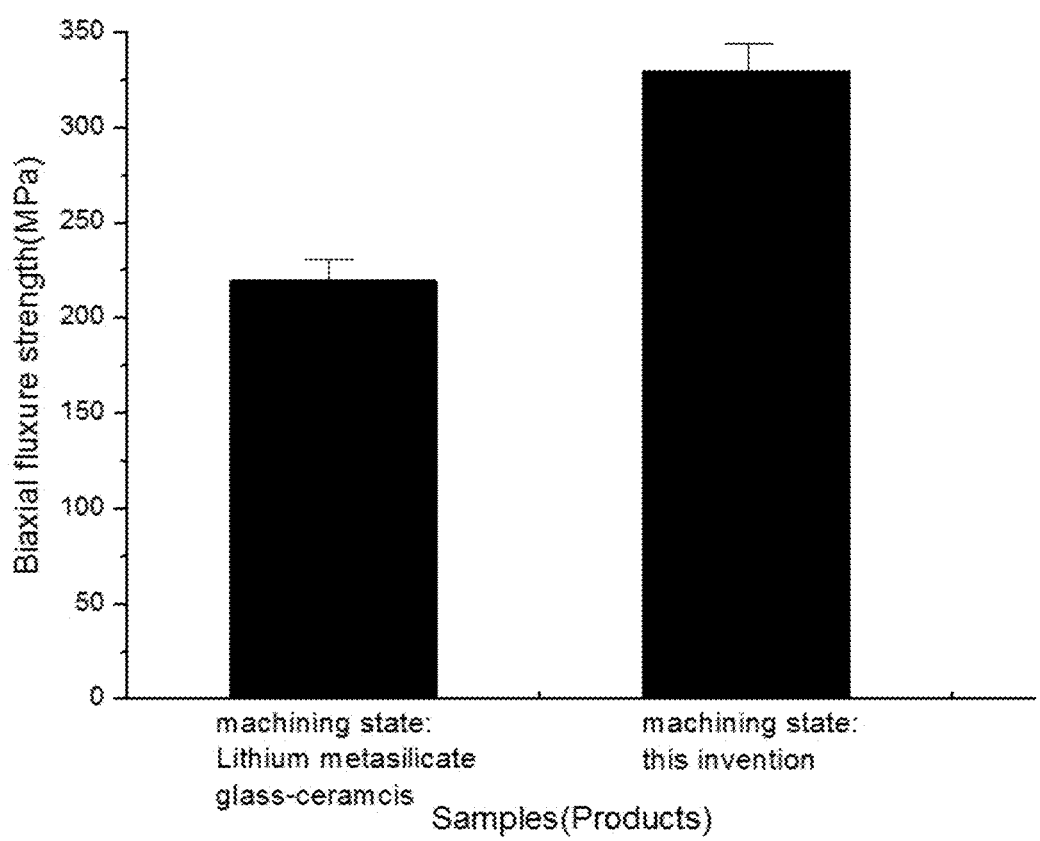
FIG. 3 is a graph showing a comparison of flexural strength between an existing product and a product of a machining state according to the present invention.

FIG. 3 is a graph showing a comparison of flexural strength between an existing lithium disilicate glass-ceramic product and a product to which the technology proposed in the present invention is applied. As shown in FIG. 3, since the product to which the technology proposed in the present invention is applied exhibits a color matching a color of a natural tooth, has high flexural strength, and is machinable, as compared to the existing product, the product is directly applicable to a clinical treatment. On the contrary, the existing product exhibits a color of a natural tooth only when the product experiences a phase transition through a secondary heat treatment. After the phase transition, the product has high strength.

Figure 4:
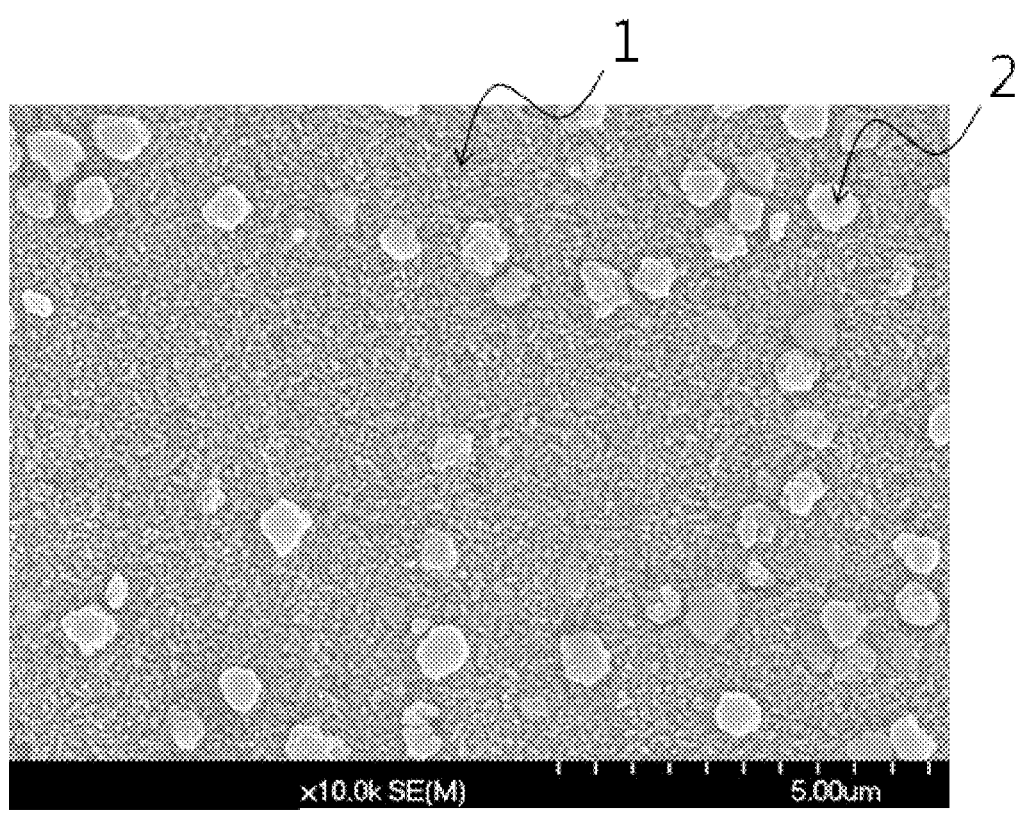
FIG. 4 is an image showing a microstructure of a block of a machining state according to an embodiment of the present invention.

FIG. 4 is an image showing a microstructure of the block of the machining after etching according to the present invention. A nano-sized lithium disilicate crystalline phase and a $SiO_2$ cluster coarser than the nano-sized lithium disilicate crystalline phase can be confirmed, and it is possible to realize machinability, strength, and aesthetics.

The artificial tooth is manufactured by performing CAD/CAM machining on the artificial tooth block made of the material prepared by the method for preparing glass-ceramics containing nano lithium disilicate and silicate crystalline phase. The artificial tooth block has high strength of 300 MPa or more due to a fine crystalline phase and is machinable. In addition, since light is scattered due to fine particles, it is possible to realize aesthetics such as opalescence similar to that of a natural tooth.

Furthermore, since a $SiO_2$ cluster having a size of 0.5 to 1.0 μm is precipitated in the fine crystalline phase, it is possible to improve machinability for the CAD/CAM machining and adjust light transmittance. That is, when the $SiO_2$ cluster is applied to a material having high light transmittance, the light transmittance is lowered due to the fine crystalline phase. Accordingly, it is possible to develop a material for an artificial tooth having various light-transmitting properties.

A high-strength material developed in the present invention is particularly useful for a 1:1 machining clinic treatment and an implant prosthetic application, which require dimension accuracy. In addition, since the inside of the block is machinable and the high-strength zirconia post is bonded to the block, the block is applicable as the prosthetic material capable of realizing both of strength and aesthetics.

While the embodiments of the present invention have been described with reference to the specific embodiments, it will be apparent to those skilled in the art that various changes and modifications may be made without departing from the spirit and scope of the invention as defined in the following claims.

What is claimed is:

1. A method for preparing an artificial tooth block for CAD/CAM machining, the method comprising:
   melting a glass composition and performing crystal growth;
   performing a primary heat treatment at a temperature of 300 to 700° C. for 1 minute to 2 hours to obtain a nano lithium disilicate glass-ceramics comprising a nano-sized lithium disilicate crystalline phase and a $SiO_2$ cluster; and
   bonding the nano lithium disilicate glass-ceramics to a zirconia post by using an inorganic bond,
   wherein the bonding comprises heat-treating the inorganic bond at a temperature of 700 to 900° C. for 1 minute to 2 hours, and
   wherein the glass composition includes:
   70 to 85 wt % $SiO_2$, 10 to 13 wt % $Li_2O$, 3 to 7 wt % $P_2O_5$ working as a nuclei formation agent;
   0 to 5 wt % $Al_2O_3$ for increasing a glass transition temperature and a softening point and enhancing chemical durability of glass;
   0 to 2 wt % $ZrO_2$, 0.5 to 3 wt % CaO for increasing a thermal expansion coefficient of the glass; and
   0.5 to 3 wt % $Na_2O$, 0.5 to 3 wt % $K_2O$, and 1 to 2 wt % colorants, and 0 to 2.0 wt % mixture of MgO, ZnO, F, and $La_2O_3$, and
   wherein the composition of the inorganic bond includes:
   8 to 12 wt % $Li_2O$;
   50 to 75 wt % $SiO_2$;
   0 to 3 wt % $Al_2O_3$;
   0.5 to 5 wt % CaO;
   0.5 to 3 wt % $Na_2O$;
   0.5 to 3 wt % $K_2O$;
   0.5 to 7 wt % $P_2O_5$ as a nuclei formation agent;
   0.5 to 1 wt % colorant; and
   0 to 1.0 wt % mixture of MgO, ZnO, F, and $La_2O_3$, and
   wherein the thermal expansion coefficient of the inorganic bond is 9.5 to $10.8 \times 10^{-6}$/° C.

2. The method for preparing the artificial tooth block of claim 1,
   wherein the glass composition includes:
   1 to 5 wt % $Al_2O_3$.

3. The method for preparing the artificial tooth block of claim 1,
   wherein the glass composition includes:
   0.5 to 2 wt % $ZrO_2$.

4. The method for preparing the artificial tooth block of claim 1,
   wherein the glass composition includes:
   0.5 to 2.0 wt % mixture of MgO, ZnO, F, and $La_2O_3$.

5. The method for preparing the artificial tooth block of claim 1,
   wherein the composition of the inorganic bond includes:
   1 to 3 wt % $Al_2O_3$.

6. The method for preparing the artificial tooth block of claim 1,
   wherein the composition of the inorganic bond includes:
   0.5 to 1.0 wt % mixture of MgO, ZnO, F, and $La_2O_3$.

7. The method for preparing the artificial tooth block of claim 1,
   wherein the glass composition includes:
   1 to 5 wt % $Al_2O_3$;
   0.5 to 2 wt % $ZrO_2$; and
   0.5 to 2.0 wt % mixture of MgO, ZnO, F, and $La_2O_3$,
   and wherein the composition of the inorganic bond includes:
   1 to 3 wt % $Al_2O_3$; and
   0.5 to 1.0 wt % mixture of MgO, ZnO, F, and $La_2O_3$.

* * * * *